S. A. DOBYNE.
BEARING SUPPORTING COLUMN.
APPLICATION FILED NOV. 15, 1918.

1,358,301.

Patented Nov. 9, 1920.

Inventor:
STEPHEN A. DOBYNE,
By John H. Bruninga
His Attorney.

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

BEARING-SUPPORTING COLUMN.

1,358,301.   Specification of Letters Patent.   Patented Nov. 9, 1920.

Application filed November 15, 1918. Serial No. 262,687.

*To all whom it may concern:*

Be it known that I, STEPHEN A. DOBYNE, a citizen of the United States, and residing at St. Louis, Missouri, have invented the new and useful Improvement in Bearing-Supporting Columns, of which the following is a specification.

This invention relates to frames for machines, and more particularly to machines adapted for the manufacture and repairing of boots, shoes and the like.

The mechanism used in this type of machines is usually supported on a column in order to render the same accessible to the operator. This column is usually provided with an integral base and on this base is mounted a drive shaft which receives the power from the shafting in the factory, and which transmits the power to the mechanism on top of the column.

One of the objects of this invention, therefore, is to provide an improved machine frame, which can be readily cast, assembled and disassembled, and which is simple in construction, cheap to manufacture and effective and convenient in its action.

Further objects will appear from the detailed description, taken in connection with the accompanying drawing, in which.

Figure 1:
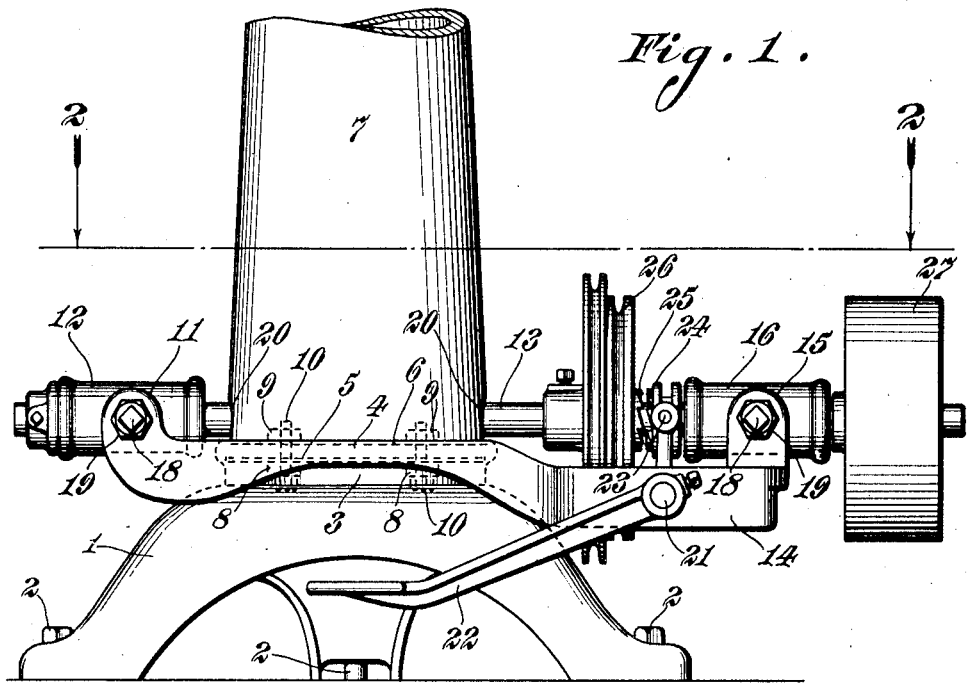
Figure 1 is a front elevation of a machine frame embodying this invention.
Figure 3:
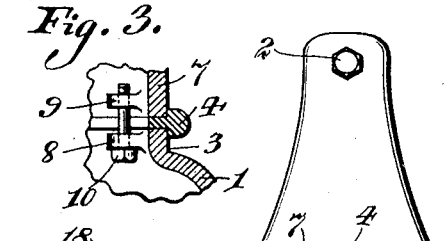
Fig. 3 is a section on the line 3—3, Fig. 2.
Figure 2:
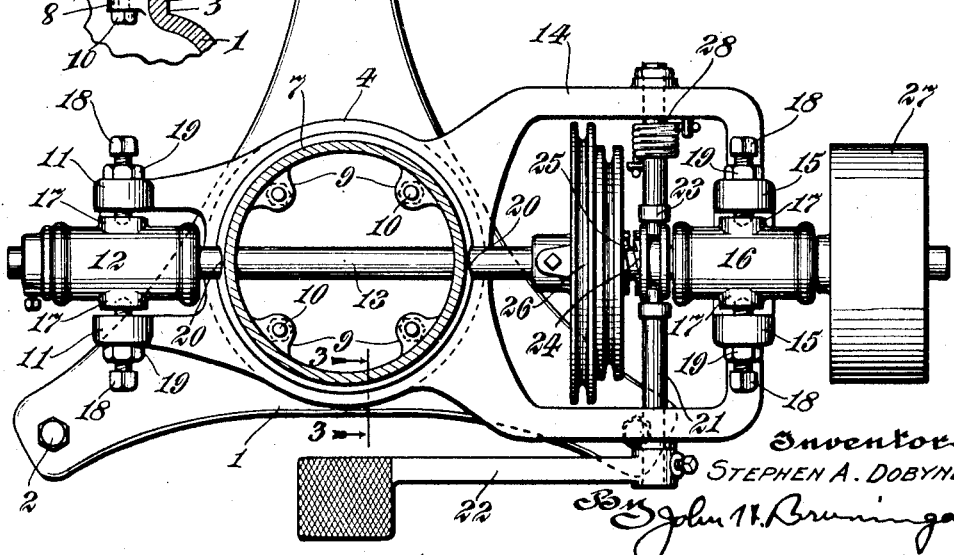
Fig. 2 is a section on the line 2—2, Fig. 1.

Referring to the accompanying drawing, 1 designates the base, which is of any suitable construction, and is adapted to be secured to the floor by bolts 2. This base has a reduced extension 3 of cylindrical form and the top of which is machined to provide a suitable bearing. Mounted on this base is a bearing bracket 4, which has a countersunk machined face 5, so as to nest with or center on the base. The top of this bracket also has a countersunk machined face 6 to receive the machined face on the bottom of the column 7 nesting and centered on the bracket. The base has a series of perforated lugs 8, while the column has a corresponding series of perforated lugs 9, the corresponding lugs of a pair being so adapted to receive a bolt 10, which secures the parts together. It will thus be seen that these bolts, connecting the column with the base, also secure the bearing bracket in position, and on account of the provision of the countersunk faces, the parts are centered and nested together.

The bracket has on one end a pair of ears 11, adapted to receive a bearing 12 for a shaft 13. The other end of the bracket has an extension 14, provided with ears 15 for supporting a bearing 16 receiving the other end of the shaft 13. For the purpose of permitting ready alinement of the bearings, these bearings are each provided with a pair of lugs 17, having countersunk recesses for receiving set screws 18, threaded in the ears 11 and 15, and to secure these screws, there is provided on each screw a lock nut 19. With this construction the bearings are self-centered on the bearing bracket. The shaft 13 intersects the bottom of the column, and to permit this, the column has a pair of recesses 20 adapted to receive the shaft. These recesses are adapted at their lower ends to permit the column to be placed over the shaft when in position on its bracket.

Mounted in the extension 14 on the bracket, is a rock shaft 21 provided with a treadle 22, fixed thereto, and having also fixed thereto a fork 23 engaging the clutch member 24 splined on the shaft and engaging a clutch member 25 on a pulley 26 loosely mounted on the shaft. The shaft 13 has also fixed thereto a belt pulley 27, adapted to receive power from line shafting. The rock shaft is moved in one direction by the treadle 22 to clutch the pulley 26 to the shaft, and is returned in any suitable manner, as by a coil spring 28 mounted on and connected at one end with the rock shaft and at its other end with the extension 14. It will thus be seen that in accordance with this invention, a machine frame is produced which can not only be readily manufactured, as the casting is very much simplified, but which can also be readily assembled and disassembled. Moreover, the addition of a separate bearing bracket permits the bearings to be positioned and alined before the bracket is placed in position, and also permits easy alinement of the parts on the bearing bracket with those on the column.

It is obvious that various changes may be made in the details of construction without departing from the spirit of this invention;

it is to be understood that this invention is not to be limited to the construction shown and described.

Having thus described the invention, what is claimed is:

1. In a machine of the class described, a base having flanged means for engaging a bearing bracket, a bearing bracket adapted to engage said flanged means, a mechanism-supporting column mounted on said bracket, and means for securing said parts together.

2. In a machine of the class described, a base having a flange, a bearing bracket adapted to embrace said flange, a mechanism supporting column mounted on said bracket, and means for securing said parts together.

3. In a machine of the class described, a base, a bearing bracket mounted on said base and having a recess, a mechanism supporting column adapted to engage said recess, and means for securing said parts together.

4. In a machine of the class described, a base having a flange, a bearing bracket adapted to engage said flange and having a recess, a mechanism-supporting column engaging said recess and embraced by said bracket, and means for securing said parts together.

5. In a machine of the class described, a base, a mechanism-supporting column, a bearing bracket embracing said column, a shaft on said bracket, and means for securing said parts together.

6. In a machine of the class described, a base, a mechanism-supporting column, a bearing bracket embracing said column, a shaft on said bracket piercing said column, and means for securing said parts together.

7. In a machine of the class described, a base, having a flange, a bearing bracket adapted to engage said flange, and having a recess, a mechanism-supporting column adapted to engage said recess, a shaft on said bracket piercing said column, and means for securing said parts together.

In testimony whereof I affix my signature this 25th day of May, 1918.

STEPHEN A. DOBYNE.